June 28, 1932. P. CREZÉE 1,864,639
OPERATING CULTIVATORS
Filed Nov. 29, 1927  3 Sheets-Sheet 1
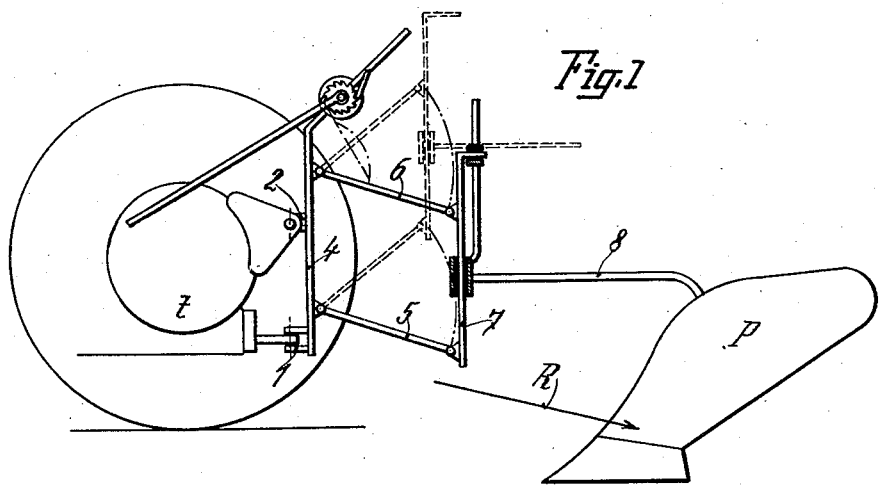
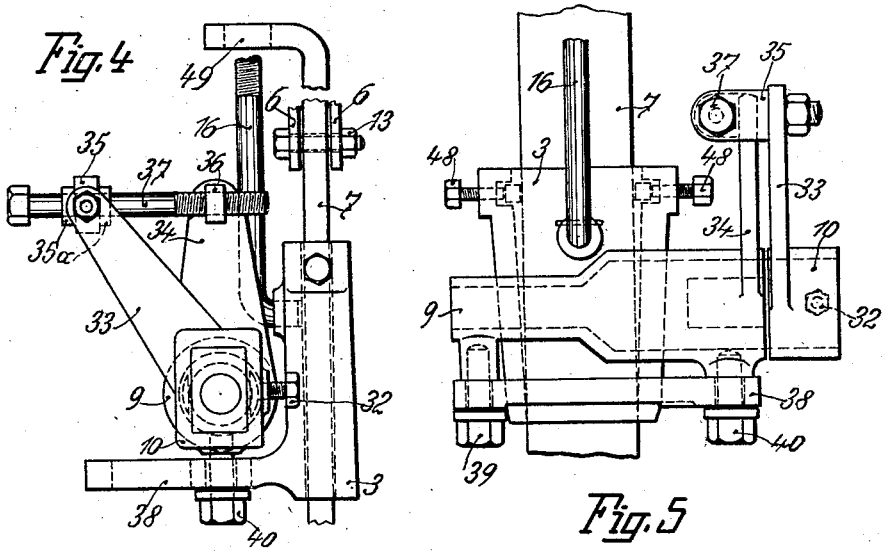
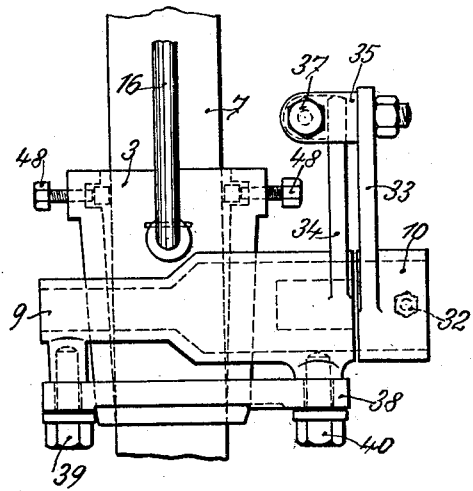
INVENTOR.
Pieter Crezée

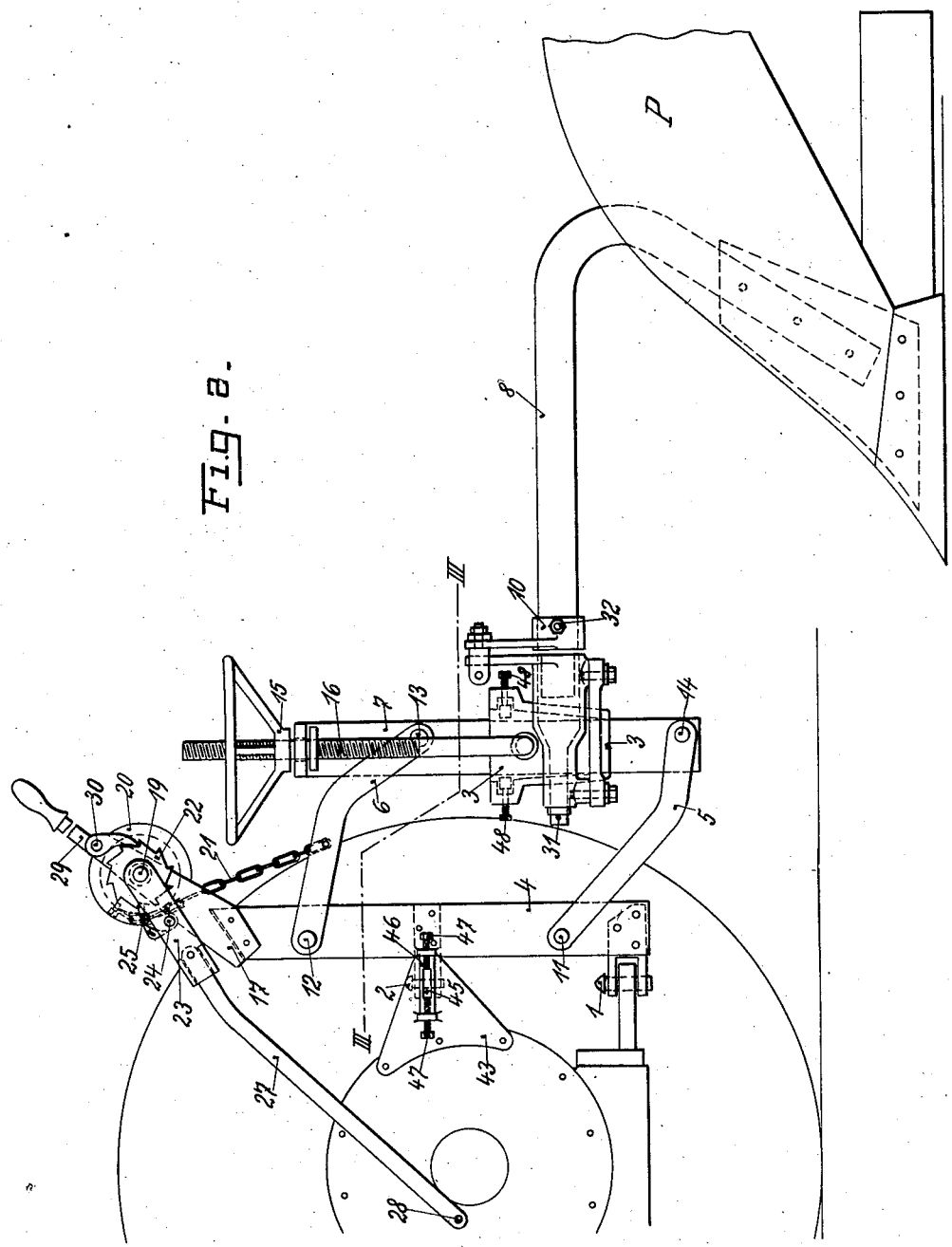

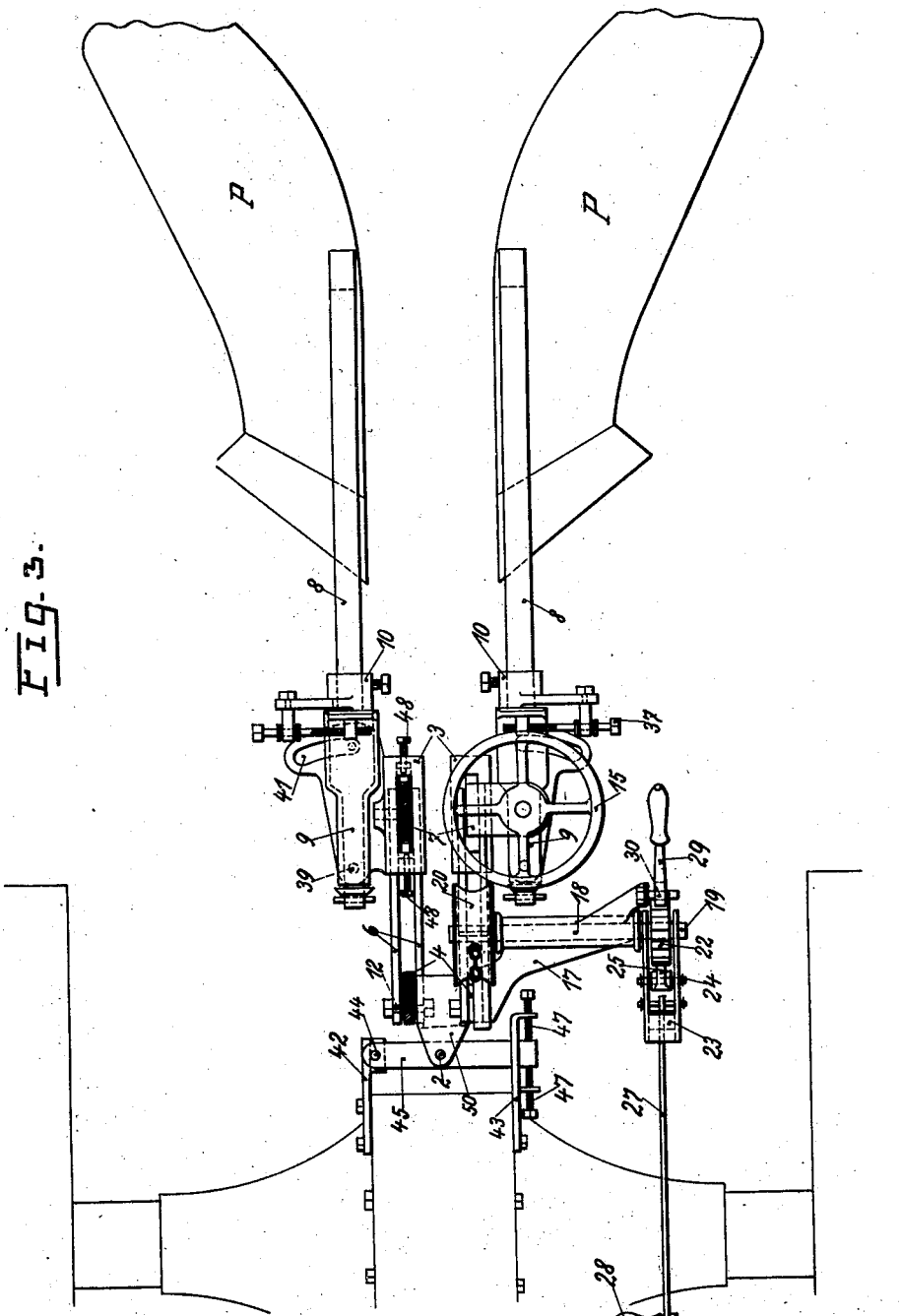

Patented June 28, 1932

1,864,639

UNITED STATES PATENT OFFICE

PIETER CREZÉE, OF ZEVENBERGEN, NETHERLANDS, ASSIGNOR TO ERNST PRINTZ, OF KETTWIG-ON-THE-RUHR, GERMANY

OPERATING CULTIVATORS

Application filed November 29, 1927, Serial No. 236,559, and in the Netherlands December 3, 1926.

The invention relates to a device intended to couple a cultivator of any type, in particular a plow or the like, with a tractor. The term tractor is to be understood here to denote any mechanical hauling machine used to haul cultivating machines or implements.

The invention has for its object to couple the cultivator with the tractor in such a manner, that the cultivator is freely movable to adjust itself in accordance with the forces acting upon it, that means in accordance with the resistance opposed by the ground, so that said forces are taken up immediately by the tractor without any intermediary of wheels, slides or the like. It is only in this way that the most favorable results are obtained as to the required hauling force and yield.

The forces that act upon the plow give as a resultant a force directed about in the direction of motion of the plow and inclined upwardly. According to the nature and condition of the ground this force has an inclination of about 1 to 4 or 1 to 5. When a plow is able to freely swing in this manner in the direction of said resultant, a change of the direction of the resultant results in a more or less deep working of the plow. According to the invention, such an effect is obtained by the fact, that a connecting means is interposed between tractor and cultivator which means may freely move in vertical direction in parallel to itself.

In order to allow of my invention to be more easily understood, a preferred embodiment of same is illustrated by way of example in the drawings which accompany and form part of this specification. In these drawings: Figure 1 is a diagrammatic lateral view of the subject-matter of my invention, Figure 2 illustrates a constructional example thereof in lateral view and enlarged scale, Figure 3 is a top view corresponding to Figure 2, partly in section on line III—III of this figure, while Figures 4 and 5 show details in a front and side view, respectively.

The cultivator coupled with a tractor in accordance with my invention, is a plow, as shown.

In the diagrammatic arrangement shown in Figure 1 $t$ designates the rear end of a tractor of known design. Pivotally secured to the tractor, at the points designated 1 and 2, is the front bar 4 of a vertically disposed parallelogram link frame. The said bar 4 is connected by the parallel links 5 and 6 to the rear vertical frame bar 7 to which is fixed the beam 8 of the plow P. Free motion of the share P is obtained by the free motion of the link frame, when the plow is in working position, this free motion being a vertical motion of the share in parallel to itself. Therefore, when in working position, the share adjusts itself in such a manner, that the resultant R of the forces of resistance is parallel to the direction of the links 5 and 6 and cuts the vertical axis 1—2. When the direction of the resultant alters due to altered conditions of the ground, the angular position of the links 5 and 6 is altered too and the plow works thus more or less deeply.

To be able to regulate the working depth of the plow, the plow beam 8 is adapted to shift in parallel to itself by the aid of the bar 7. When such a shifting motion takes place, the point of application of the resultant R is shifted likewise relatively to the link frame. This shifting has however no influence upon the action of the plow, as the links of the said frame adjust themselves into the direction of the resultant R independently of the location of their point of application.

A constructive realization of the described device is illustrated in Figures 2 to 5, these figures showing a tractor-hauled plow having a left-hand and a right-hand share suspended beside one another and working alternately. The described principle may of course be employed with a one share plow.

The vertical front bars 4 which are interconnected by an intermediate piece 50, Figure 3, form part of two parallelogram link frames arranged in parallel to one another. The bars 4 are pivotally connected with the tractor by means of eyes and bolts 1, 2. The links 5 and 6 are pivoted on the bars 4 at 11 and 12. The rear ends of the links 5 and 6 are hinged by bolts 13 and 14 to a rear bar 7. In order to enable the two link frames to take up also lateral forces, the latter joints are designed as shown in Figure 4. As to be seen from this figure, the bolts 13 and 14 are designed as screw bolts which pass with play through the bar 7 and interconnect the companion links 5, 5 and 6, 6. In this way it is possible to so regulate the distance existing between the links 5, 5 and 6, 6, that they abut on both sides on the bar 7.

A slide 3 is adapted to be shifted up and down on bar 7, whereby the plow can be adjusted on a higher or lower level. On the top the bar 7 is outwardly bent rectangularly and the bent portion has a bore 49, see Figure 4, through which passes a threaded spindle 16 carrying above the lug 49 a hand wheel 15 that forms a nut. The lower end of spindle 16 is fixed on the slide 3, so that the working depth of the plow may be adjusted by turning hand wheel 15.

The plow is lifted from working position by raising the links 5 and 6 and the bar 7 of the link frame. To this end, a carrier 17 is fixed on the upper end of the intermediate piece 50, which carrier has mounted in it a bearing sleeve 18 wherein a shaft 19 is rotatably mounted. On its inner end the shaft 19 has fast on it a chain wheel or drum 20 on which a chain 21 is wound the other end of which is fixed on one of the links 6. On its outer end the shaft 19 has further fixed on it a ratchet wheel 22. An arm 23 is further loosely mounted on shaft 19, which arm has pivoted on it by pin 24 a loose pawl 25. When arm 23 is raised, pawl 25 carries with it the ratchet wheel 22; when lowered, pawl 25 glides idly over the teeth of ratchet wheel 25. The arm 23 has further fixed on it a lever 27 with a handle 28, see Figures 2 and 3. When it is desired to lift the plough the ratchet wheel 22 is actuated, through the medium of the lever 27 and pawl 25, to exert an upward pull on the chain 21 until the plough is raised to the desired position.

To prevent the plow from falling back after each stroke of hand lever 27, 28, a check pawl 29 is provided which is pivoted on a pin 30 mounted on the carrier 17, see Figure 3.

To lower the plow into working position, the pawls 25 and 29 are thrown out of gear, whereby the plow falls down.

Furthermore the following means are provided on the plow to adjust it:

Means for varying the angle of inclination: The beam 8 is lodged with its round front end in a supporting sleeve 9 and is secured therein by a bolt 31, see Figure 2, a clamping piece 10 arranged on the rear end of sleeve 9 fixing the beam 8 therein. The clamping piece 10 is secured against turning on the beam 8 by a bolt 32. The piece 10 and sleeve 9 carry each a lateral arm 33 and 34, respectively, see Figures 4 and 5, having lateral lugs 35 and 36, respectively, the latter forming a nut. A set screw 37 passes with play through lug 35 and engages nut 36, collars 35a being provided on both sides of lug 35 on bolt 37. By turning bolt 37 the beam 8 is turned in the sleeve 9 and therewith the share is turned too.

Means for adjusting the working width of the plowshares: To this end, the slide 3 carries a lateral table 38, see Figures 4 and 5, on which the sleeve 9 may be clamped by means of two bolts 39 and 40. When these bolts are somewhat loosened, sleeve 9 is capable to rock around bolt 39, as bolt 40 is guided in an arcuate slot 41 provided on table 38, see also Figure 3. By tightening home the bolts 39, 40 the sleeve 9 can be fixed in different angular positions. In this way a variation of the working width of the two plowshares is obtained, as the plow beams 8 may diverge more or less from one another and can be fixed in their mutual position. The arrangement has been so chosen, that the beams 8 when assuming the narrowest mutual position, are parallel to one another and diverge more or less when adjusted on greater working width.

Means for adjusting the lateral angle of the plowshare: Two triangular plates 42 and 43 are fixed on the underframe of the tractor, see Figures 2 and 3. The plate 42 has a rectangularly bent-off lug wherein a bolt 44 is lodged. A bridge piece 45 is pivoted on bolt 44 so as to be swung horizontally, this bridge piece further carrying the upper fulcrum 2. The other end of piece 45 is guided in a slot 46 of plate 43. Set screws engaging each a lug of plate 43 enable to horizontally displace the free end of piece 45 and therewith also the fulcrum 2. When this takes place, the intermediate piece 50 and thus also the bars 4 swing in a vertical plane around point 1. This swing motion is transferred by the links 5, 6 to the plowshare which in this manner are brought to penetrate the ground to a greater or smaller extent. In the embodiment illustrated both plowshares are adjusted in common by the described means.

To enable a re-adjustment and to secure thereby a uniform penetration of both plowshares, a special adjusting device is provided, see Figure 5. To this end the narrow front and rear guide faces of the slide 3, which tightly abut on bar 7 on the bottom, diverge in upward direction. By means of two set screws 48 arranged on the top of slide 3 it is possible to somewhat cant slide 3 on the bar 7 and to obtain thus a correction of the position of the plowshares.

Sudden concussions or vibrations of the tractor when running influence the position of the plowshares. To eliminate these influences, the set screws 47 are so adjusted, that the bridge 45 has some play in the travelling direction, so that the fulcrum 2 may also be displaced in this direction. Consequently, when one of the tractor wheels runs over an obstacle on the ground, this play prevents the plowshare from being acted upon thereby.

What I claim, is:—

1. The combination of a tractor and a plow, and a draft connection between said tractor and said plow comprising a plow beam, a vertically disposed parallelogram link frame interposed between said tractor and said beam and adapted to swing around a vertical axis on said tractor, and means for enabling said beam to turn around its longitudinal axis, to be displaced vertically in parallel to itself, to be inclined vertically, and to be swung horizontally, relatively to said frame.

2. The combination of a tractor and a plow, and a draft connection between said tractor and said plow comprising a plow beam, a vertically disposed parallelogram link frame interposed between said tractor and said beam, a slide adapted to be displaced vertically on said frame, a sleeve mounted on said slide and adapted to receive the free end of said beam, a lever fixed on said sleeve and extending at right angles to its longitudinal axis, another lever fixed on said beam and extending at right angles to its longitudinal axis, and means for varying the mutual angular position of said levers, and means for swinging said beam vertically and horizontally relatively to said frame.

3. The combination of a tractor and a plow, and a draft connection between said tractor and said plow comprising a plow beam, a vertically disposed parallelogram link frame interposed between said tractor and said beam, a slide adapted to be displaced vertically on said frame, a sleeve mounted on said slide for horizontal swinging motion relatively thereto and adapted to receive the free end of said beam, a lever fixed on said sleeve and extending at right angles to its longitudinal axis, another lever fixed on said beam and extending at right angles to its longitudinal axis, means for varying the mutual angular position of said levers, and means for swinging said beam vertically relatively to said frame.

4. The combination of a tractor and a plow, and a draft connection between said tractor and said plow comprising a plow beam, a vertically disposed parallelogram link frame interposed between said tractor and said beam, a slide adapted to be displaced vertically on said frame and to be rocked in a vertical plane relatively thereto, a sleeve mounted on said slide for horizontal swinging motion relatively thereto and adapted to receive the free end of said beam, a lever fixed on said sleeve and extending at right angles to its longitudinal axis, another lever fixed on said beam and extending at right angles to its longitudinal axis, and means for varying the mutual angular position of said levers.

5. A coupling for securing an earth working implement to a tractor comprising a vertically disposed parallelogram link frame having its front vertical bar secured to the tractor by upper and lower pivotal connections, means for adjusting the position of the upper pivotal connection to effect swinging movement of said bar in a vertical plane about a fulcrum afforded by the lower pivotal connection and means for connecting the earth working implement to the rear vertical bar of said frame.

6. A coupling for securing an earth working implement to a tractor comprising a vertically disposed parallelogram link frame presenting a front vertical bar, a pivotal connection between the tractor and the lower portion of said bar, a bridge-piece pivoted to the tractor to swing about a vertical axis, means for adjusting the position of said cross-piece, a pivotal connection between said cross-piece and the upper portion of said bar and means for connecting the earth working implement to the rear vertical bar of said frame.

7. The combination of a tractor, a vertically disposed parallelogram link frame having its front vertical bar pivotally connected to the tractor, a slide adjustable vertically on the rear bar of said frame, an earth working implement having a beam secured to said slide so as to be adjustable therewith and means for securing said slide in selected positions of vertical adjustment.

8. An arrangement as recited in claim 7 in which the said beam is secured to the slide by means permitting axial rotation of the beam to vary the angle of inclination of the earth working implement and means for securing the earth working implement in the angular position to which it is adjusted by rotation of the beam.

9. The combination of a tractor, a vertically disposed parallelogram link frame presenting front and rear vertically disposed bars and intermediate upper and lower links extending between and connecting corresponding portions of said bars, means pivotally securing the front bar to the tractor, an earth working implement equipped with a horizontally extending beam and means connecting the forward end of the beam to the rear vertical bar of said frame, said connecting means including provision for adjusting said beam vertically with respect to said bar and for effecting turning movement of the beam about its longitudinal axis.

10. A combination as recited in claim 9 in which the frame and the bar are swingable horizontally about an axis afforded by the means pivotally connecting the front vertical bar of the frame to the tractor.

11. The combination with a tractor, of a vertically disposed parallelogram link frame presenting front and rear vertical bars and intermediate upper and lower links extending between and connecting corresponding portions of said bars, the front bar of the frame being secured to the tractor by upper and lower pivotal connections permitting the frame to swing horizontally with reference to the tractor, means for horizontally shifting the position of the upper pivotal connection to cause said front bar to swing in a vertical plane about a fulcrum afforded by the lower pivotal connection and an earth working implement having a horizontally extending beam connected at its free end to the rear vertical bar of said frame.

12. The combination recited in claim 11 including means secured to the rear bar of the frame and to the beam for effecting vertical adjustment of the beam with respect to said bar.

13. The combination recited in claim 11 including means carried by the rear bar of the frame and by the beam for effecting axial adjustment of the beam.

14. The combination recited in claim 11 including a lifting device carried by the front bar of the frame and connected to the upper intermediate link.

15. The combination with a tractor and a cultivator implement equipped with a horizontally extending beam, of a coupling in the form of a vertically disposed parallelogram link frame presenting a front vertical bar connected to the tractor, a rear vertical bar connected to said beam and intermediate upper and lower links extending between and connecting corresponding portions of said bar, the connections between the front bar and the tractor and the connections between the rear bar and the beam being such as to provide for adjustment of the beam about its longitudinal axis; vertical adjustment of the beam along the length of the rear bar and vertical and horizontal swinging movement of the beam with reference to the tractor.

In testimony whereof I affix my signature.

PIETER CREZÉE.